Oct. 3, 1961        E. A. HAASE        3,002,348

FUEL FEED AND POWER CONTROL SYSTEM FOR GAS TURBINE ENGINES

Filed Nov. 1, 1955        2 Sheets-Sheet 1

*INVENTOR.*
ELMER A. HAASE
BY *R. G. Brodahl*
ATTORNEY

Oct. 3, 1961  E. A. HAASE  3,002,348
FUEL FEED AND POWER CONTROL SYSTEM FOR GAS TURBINE ENGINES
Filed Nov. 1, 1955  2 Sheets-Sheet 2

INVENTOR.
ELMER A. HAASE
BY
R. G. Brodahl
ATTORNEY

3,002,348
Patented Oct. 3, 1961

3,002,348
FUEL FEED AND POWER CONTROL SYSTEM FOR GAS TURBINE ENGINES
Elmer A. Haase, South Bend, Ind., assignor to The Bendix Corporation, a corporation of Delaware
Filed Nov. 1, 1955, Ser. No. 544,136
8 Claims. (Cl. 60—39.28)

The present invention relates to a fuel control system for a gas turbine engine and more particularly to a fuel control system for a gas turbine engine which controls the acceleration and deceleration operation of said gas turbine engine.

In the acceleration control of a gas turbine engine including an axial flow compressor, an operational phenomenon known as compressor stall or surge may be encountered in which the back pressure of the compressor exceeds some critical value that usually results in a sudden and drastic reduction in the quantity of air delivered to the engine burners. When such a condition occurs, the temperature of the burner units and the compressor vibration may become sufficiently high to cause serious damage to the engine unless there is an immediate sharp reduction in the quantity of fuel delivered to the engine.

Accordingly, it is desirable that in the operation of the gas turbine engine the compressor stall or surge characteristic of that engine be avoided, and that the fuel flow to the engine during acceleration be limited by the compressor stall characteristic as the maximum fuel flow limitation.

Accordingly, it is an object of the present invention to provide an improved fuel control system for a gas turbine engine having an axial flow compressor unit.

It is another object to provide an improved fuel control system for a gas turbine engine which fuel control system will permit a better acceleration rate throughout the entire operating range of the engine.

It is a different object to provide an improved fuel control system for a gas turbine engine, which system controls the fuel supplied to the engine as a function of certain predetermined engine operational parameters.

It is an additional object to provide an improved fuel control system for a gas turbine engine for furnishing an initial supply of fuel in accordance with a first operational rate or schedule and removing from that supply of fuel an amount in accordance with a second operational rate or schedule as may be desired.

It is a further object to provide an improved fuel control system which initially furnishes a supply of fuel in accordance with a desired acceleration rate or schedule and which removes from that supply of fuel an amount such that the engine is operated in accordance with the desired speed or engine running rate or schedule.

These and other objects and advantages of the present invention will become apparent in view of the following description taken in conjunction with the drawings wherein.

Figure 1:
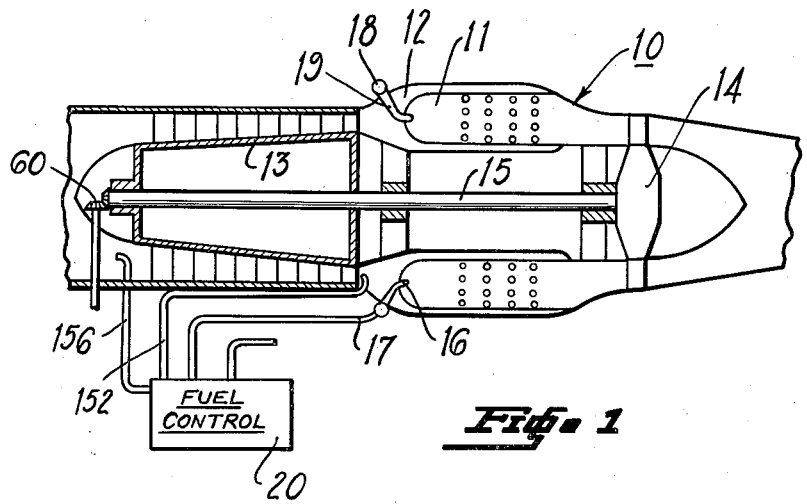
FIGURE 1 is a sectional view of a turbo-jet engine having operatively associated therewith a control combining the features of the present invention.

Referring now to FIGURE 1 the gas turbine engine 10 is shown having one or more combustion chambers 11 mounted in a casing having a header or air intake section 12. A dynamic compressor 13 is shown as of the axial flow type and is driven by means of a turbine unit 14 through a drive shaft 15. Each of the combustion chambers 11 is provided with a burner nozzle 16 to which metered fuel is supplied under pressure by way of a fuel conduit 17, fuel manifold 18 and individual fuel lines 19. The fuel conduit 17 receives metered fuel from a fuel control device 20 that is shown primarily in sectional schematic in FIGURE 2 and which will now be described.

Fuel enters the control device 20 through an inlet fuel conduit 22 at a pressure $P_1$ which is supplied by a fuel pump 24 the inlet of which is connected to a fuel supply tank (not shown) by means of fuel conduit 26. The supply of fuel to the burner nozzle 16 (shown in FIGURE 1) flows from inlet conduit 22 to outlet metered fuel conduit 17 by way of a passage 28, a chamber 30, a main metering restriction 32 the area of which is controlled by a main metering valve 34 and then into a chamber 36 at metered fuel pressure $P_2$ and through an outlet passage 38. The area of the metering restriction 32 is controlled by the position of the metering valve 34 which is determined by the action of a pressure modulator unit 40, springs 42 and 44 and a servo pilot valve 46.

Fuel may also flow from inlet conduit 22 through a branch circuit 48, a by-pass valve unit generally shown at 50 and a fuel conduit 52 to the return or inlet side of the fuel pump 24 at fuel pump inlet pressure $P_0$. The position of the by-pass valve member 54 determines the quantity of fuel which will pass or flow through the metering restriction 32 at any given position of the metering valve 34. The position of the by-pass valve 54 at any given engine operating condition is controlled by the speed head generator unit 56. The speed head generator unit 56 includes the engine driven speed head generator weight 58 which is adapted to be suitably driven from the main engine shaft 15 of gas turbine engine 10 by a gearing arrangement, such as schematically shown at 60 (see FIGURE 1) connected to drive shaft 62 of FIGURE 2. The speed head generator unit 56 functions to control the pressure drop across the main metering valve restriction 32 as a function of engine speed by controlling the position of the by-pass valve member 54. The speed head weight member 58 operates to move axially an outer sleeve member 66 which physically acts against a pivoted lever 68 that is pivoted at pivot connection 70. A second control lever 72 is connected with the first control lever 68 such that they rotate as a single unit about the pivot connection 70. The second control arm 72 presses against the flanged end 74 of a control member 76 connected to a movable piston member 78. A fulcrumed control lever 80 has one end connected to a servo pilot valve 82 and the other end connected to the movable piston member 78 through an adjustable connecting arm 84. The servo pilot valve 82 cooperates with a servo seat 84 for the valve such that the fluid pressure within the channel 86 leading to the chamber 88 can be varied by the movement of the servo pilot valve 82. The chamber 88 contains fuel at pressure $P_x$ which acts upon the underside of a movable diaphragm 90 that controls the position of the by-pass valve member 54. Control fuel at pressure $P_1$ passes from the fuel pump 24 through the inlet fuel conduit 22 and the fuel passage 48 into the chamber 92 at the upper side of the by-pass valve member control diaphragm 90.

Figure 2:
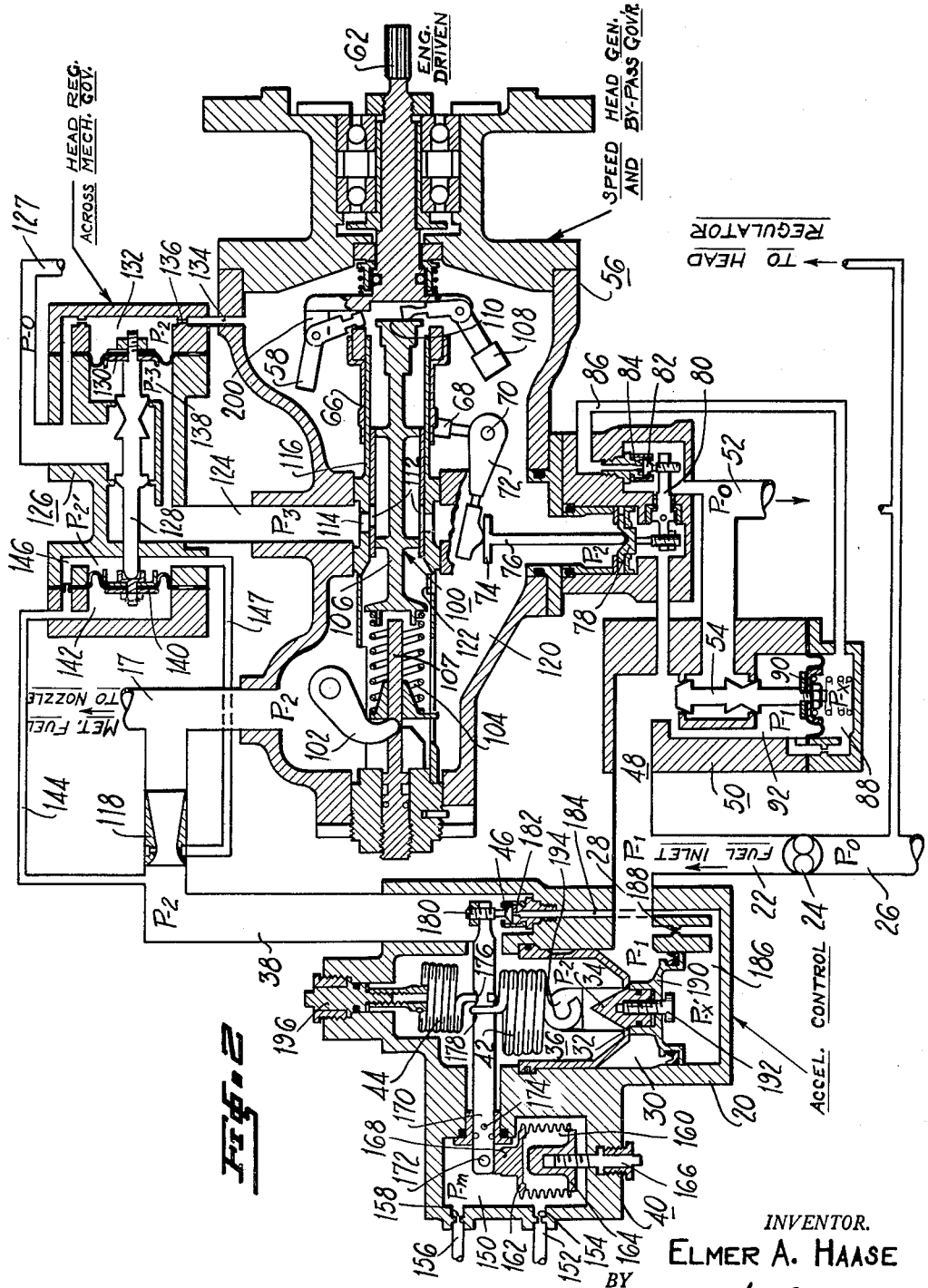
FIGURE 2 is a sectional schematic view of the fuel control system in accordance with the present invention as used on the engine shown in FIGURE 1.

The all-speed governor valve unit 100 is adjustable to any desired and preselected speed within the operative range of the engine by a lever member 102 which is connected to and operative with the pilot control throttle member (not shown). The lever member 102 when rotated counterclockwise as shown in FIGURE 2 increases the compression stress in the governor valve control spring 104. The governor spring 104 controls the position of the movable governor valve member 106 against the force of the second speed responsive weight member 108 which is acting against the flanged end 110 of the governor valve member 106. The latter governor valve member 106 includes orifice openings 112 which are operative with openings 114 in a governor valve sleeve member 116.

Metered fuel from the acceleration control metering restriction 32 passes through the fuel conduit 38 to the outlet fuel conduit 17 through a venturi type of fuel flow measuring device 118. The metered fuel at pressure $P_2$ within the outlet fuel conduit 17 passes into the chamber 120 of the governor control valve 100. The latter fuel then passes through the opening 122 in the outer valve sleeve member 116, through the interior of the governor valve member 106, through the valve member opening 112 and the sleeve member opening 114, and to an outlet fuel conduit 124 at pressure $P_3$. This control fuel at pressure $P_3$ then passes from the fuel conduit 124 through a governor valve head regulator unit 126 to an outlet fuel conduit 127 which is connected to the fuel conduit 26 at the inlet side of the fuel pump 24. The head regulator unit 126 includes a movable valve member 128 which is connected at a first end to a diaphragm 130 which is exposed to a first fuel chamber 132 supplied fuel at pressure $P_2$ from the chamber 120 of the governor valve 100 through a fuel passage 134 and a fixed orifice member 136 and a second chamber 138 on the opposite side of the control diaphragm 130. The second chamber 138 is supplied control fuel at pressure $P_3$ from the fuel conduit 124. The second end of the head regulator movable valve member 128 is connected to a second control diaphragm member 140 which is positioned between a first chamber 142 filled with control fuel at pressure $P_2$ through the fuel conduit 144 connecting to the metered fuel conduit 38. The fuel chamber 146 at the opposite side of the control diaphragm 140 is supplied with control fuel from the output of the venturi device 118 through the fuel conduit 147 at pressure $P_2'$. The pressure $P_2'$ of the latter control fuel varies as a function of the mass of the fuel flowing through the venturi device 118 from the metered fuel conduit 38 to the outlet fuel conduit 17.

The pressure modulator unit 40 includes a modulated pressure $P_m$ chamber 150 which communicates with the discharge pressure ($P_c$) of the compressor unit 13 (shown in FIGURE 1) through a conduit 152 including a calibrated bleed 154, and with the compressor inlet pressure ($P_1$) through a second conduit 156 having a calibrated bleed 158. An expansible and evacuated bellows member 160 is positioned within the modulated pressure chamber 150 and is sealed from the surrounding atmosphere by cover plate members 162 and 164, with the cover plate member 164 being fixed in position by adjustable screw member 166. The upper cover plate member 162 includes an extended arm 168 which is attached to a scale lever 170 by a connecting pin 172. The scale lever 170 is fulcrumed by pin 174 and contains grooves 176 and 178 to retain the hooked ends of the trim spring 44 and the scale spring 42 respectively. The servo pilot valve 46 is of the half-ball type and is operatively connected to the right hand end of the scale lever 170 by an adjustable connecting stud 180. The servo pilot valve 46 is adapted to control the effective area of an orifice 182 which is connected to a conduit 184 through which said orifice 182 communicates with a fuel pressure chamber 186 and with conduit 28 through a calibrated bleed 188, respectively. The upper end of the fuel chamber 186 is bounded by a movable piston member 190 which is fixedly connected to the metering valve 34 by a connecting stud 192. Extension member 194 of the piston 190 is connected to the lower end of scale spring 42. Both the scale spring 42 and the trim spring 44 are tension springs, with the latter trim spring 44 being manually adjustable by an adjustable screw member 196.

The operation of the pressure modulator unit 40 is more fully described in application Serial No. 388,754, filed October 28, 1953, now Patent No. 2,950,596, by Elmer A. Haase and Albert P. Schnaible and assigned to the same assignee as the present invention.

The size of the calibrated bleeds 154 and 158 are very carefully selected so that said bleeds have a predetermined area ratio, the selection of which is determined by the particular compressor characteristic of the engine of the type specified to be controlled. It has been found that with the properly selected bleed area ratio the modulated pressure ($P_m$) varies directly or is effectively the measure of some predetermined function of compressor pressure ratio $$\frac{P_c}{P_1}$$

The specific desired function of the compressor pressure ratio for any given engine as effectively measured by pressure $P_m$ is determined by the effective bleed area ratio. The bleed areas are selected so that the velocity of the flow of air through the second bleed 158 reaches sonic at some predetermined compressor pressure ratio, which results in pressure $P_m$ becoming some predetermined fixed percentage of the compressor outlet pressure $P_c$ at all compressor pressure ratios above said predetermined compressor pressure ratio.

The operation of the pressure modulator unit 40 is such that the position of the metering valve 34 defines an area at metering orifice 32 which varies directly as a function of compressor pressure ratio and that for any given fuel pressure head across said metering orifice 32 a fuel flow to the burner nozzles 16 will result which is also proportional to said predetermined function of compressor ratio.

The speed head generator section 56 functions to generate the fuel metering head across the metering restriction 32 which varies as the square of engine speed. The engine speed sensing weight 58 is mounted on the outer end of a lever 200 such that the speed sensing weight 58 exerts a force on the movable sleeve member 66 proportional to the square of engine speed. This force in addition to the force exerted by the control fuel at pressure $P_2$ on the upper side of the movable piston 78 are opposed by the force of the control fuel at the higher pressure $P_1$ against the underside of the movable piston 78. Thus an effective balance is provided between these opposing forces at any equilibrium condition of the engine operation.

During a transient condition of engine operation, for example during an acceleration, the control member 102 is rotated counterclockwise when an acceleration or increase in engine speed is requested by the pilot's control throttle member. This counterclockwise rotation of the control member 102, through the force of the governor spring 104, moves the governor valve 106 such that fuel flow through the governor valve orifice opening 112 and the sleeve member orifice opening 114 is stopped, which in turn stops the flow of fuel from the outlet conduit 17 through the governor valve 100 to the outlet conduit 124. This causes all the fuel flowing through the acceleration control unit metering restriction 32 to pass through the conduit 17 to the nozzles 16 (shown in FIGURE 1).

The engine speed increases due to the increased fuel flow. The force output of the speed generator weight 58 increases as the square of engine speed and thereby controls the pressure differential ($P_1-P_2$) across piston 78 through the control arm 76. This is accomplished by tending to close the half-ball orifice 84 to increase the fuel pressure $P_x$ in the chamber 88, which moves the bypass valve member 54 towards a closed position such that inlet fuel pressure $P_1$ raises until the pressure differential ($P_1-P_2$) across the piston 78 is such as to balance the force output of the speed weight 58.

Also, this increase in the fuel pressure $P_1$ effectively increases the metering head across the acceleration control valve 20 to increase the flow of fuel to the engine to thereby accelerate the operation of the engine as requested by the control member 102.

Further, this increase in engine speed increases the compressor outlet pressure $P_c$ as supplied to the pressure modulator chamber 150 through the conduit 152. This in turn increases the modulated pressure $P_m$, and further collapses the bellows member 160. This causes the lever 170 to open orifice 182 to decrease the pressure $P_x'$ in the chamber 186. This causes the piston 190 to move downward, and further increases the orifice area of the metering restriction 32 to cause the engine to increase its speed in accordance with the acceleration curve 212 of FIGURE 4.

Figure 3:
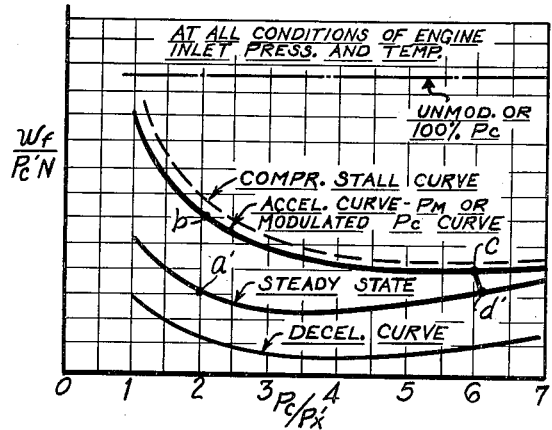
FIGURES 3 and 4 are curve charts which illustrate the operational performance of the fuel control system shown in FIGURE 2.

For purposes of illustration only, an engine which has a compressor stall curve such as shown in FIGURE 3, the bleed area ratio would be chosen so that the air flow through the second bleed 158 attains sonic velocity at a compressor pressure ratio of 4.5, at which ratio the acceleration curve flattens out to follow the compressor stall curve. After critical or sonic velocity is attained through the bleed system, further increase in the compressor ratio has no effect on the $$\frac{W_f}{P_c \cdot N}$$

parameter as illustrated in FIGURE 3, inasmuch as $P_m$ maintains a constant percentage relationship to $P_c$ through the critical flow range. The tension of the trim spring 44 is adjusted by the control screw member 196 to vary the overall elevation of the acceleration curve so that it will follow the compressor stall curve as closely as is practical. The area ratio of the bleeds can of course be varied as required to attain a condition of critical or sonic flow at greater or lesser compressor ratios than is illustrated in FIGURE 3, thereby resulting in a relatively simple control mechanism which is easily adaptable to other engines having different compressor stall characteristics than illustrated in FIGURE 3.

Figure 4:
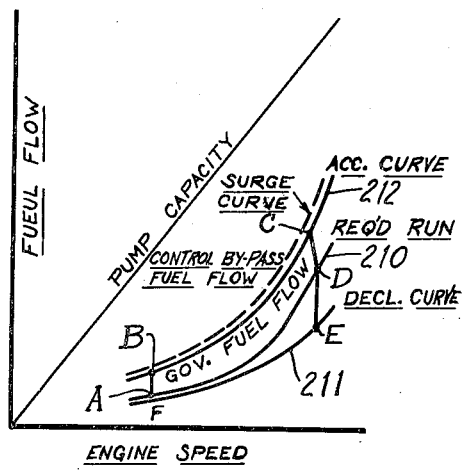

Referring now to FIGURE 4, a curve chart is illustrated in which the curves of FIGURE 3 have been transposed to indicated typical operating characteristics at sea level standard conditions. If it is assumed that the engine is operating at steady state point A on the required to run fuel flow curve 210, the fuel flow being metered by the metering restriction 32 of the acceleration control member minus the fuel flow through the governor valve unit 100 is equal to that quantity necessary to produce that amount of engine torque which the engine requires to run at that speed. If now the pilot should desire to accelerate to point D on the required to run curve 210, the pilot resets the pilot's control throttle and thereby the control member 102 shown in FIGURE 2 to a position which corresponds to the power condition which exists at point D, which in turn resets the governor spring 104 to govern the engine to operate in accordance with point D. This acceleration or counterclockwise movement of the control member 102 acts to move the valve member 106 of the governor valve 100 to close the fuel path between the fuel opening 112 in the valve member 106 and the fuel opening 114 in the valve sleeve 116. This increases the flow of fuel to the nozzles from the outlet fuel conduit 17. The increase of fuel to the engine nozzles increases the engine speed, and the speed weight 58 causes the servo pilot valve 82 to tend to close the orifice opening 84 such that the control fuel pressure within the fuel chamber 88 at the underside of the control diaphragm 90 increases to move the by-pass valve member 54 toward its closed position. This increases the control fuel pressure $P_1$ in the fuel conduit 48, which in turn increases the pressure differential $P_1-P_2$ across the metering restriction 32 and the fuel flow through the metering orifice 32 to a point B on the acceleration curve 212 of FIGURE 4. At point B the metering valve 34 of FIGURE 2 has not moved to thereby change the area of the fuel metering restriction 32 inasmuch as the compressor pressure ratio is substantially the same at point B as it was at point A. The fuel flow increase to the nozzles from point A to point B is therefore accomplished with the existing area of the metering restriction 32, and is due to the closing of the governor valve unit 100 and the sudden increase in pressure drop $(P_1-P_2)$ across the metering restriction 32 resulting from the resetting of the by-pass valve 54. From point B to point C on the acceleration curve 212 the fuel flow increases at such a rate as to closely follow the compressor surge curve as described with respect to FIGURE 3. During this latter period, the metering valve 34 moves in an opening direction at a rate which is proportional to the changing modulated pressure $P_m$ while the speed head generator unit 56 is operative to generate a pressure head $(P_1-P_2)$ across the metering restriction 32 which is proportional to the square of engine speed as hereinbefore described. When the new engine speed setting is attained at point C on the acceleration curve 212 of FIGURE 4 the force of the speed governor weight 108 attains a value which overcomes the force of the governor spring 104 and moves the governor valve member 106 to the left as shown in FIGURE 2 toward its open position thereby decreasing the flow of fuel to the nozzles from the fuel conduit 17 by removing or by-passing part of the fuel flow through the metering restriction 32 away from the conduit 17 until point D on curve 210 of FIGURE 4 is reached. At point D the fuel control mechanisms are again in equilibrium and the metering control valve 34 has been actuated to a position at which the scale spring 42 is in balance with the bellows member 160 to control the position of the servo pilot valve 46 which maintains said position of the metering valve 34.

The acceleration schedule just described is illustrated in FIGURE 3 by the curve through points B and C from point A to point D which conditions are true for all operational altitudes. The governor valve 100, the speed head generator 56 and the pressure modulator unit 40 shown in FIGURE 2, now function conjointly to produce a fuel flow through the metering restriction 32 which maintains the engine at a steady state condition for any given setting of the governor valve 100 irrespective of changes in engine inlet pressure and/or temperature.

During a deceleration of the engine as from point D to point A through points E and F, the reverse of the foregoing operations takes place and the engine decelerates at sea level along the curves D, E, F, A, as shown in FIGURE 4.

More specifically, for a deceleration of the engine, the control member 102 is rotated clockwise, thereby reducing the compression stress in the governor spring 104. The output force of the speed weight 108 moves the governor valve 106 to the left (as shown in FIGURE 2) against an adjustable maximum flow stop 107 to decrease the fuel flow to the nozzles by by-passing or removing still more of the fuel from the fuel conduit 17 until point E on the deceleration curve 211 is reached. The compressor output pressure $P_c$ decreases and the speed head or pressure differential $(P_1-P_2)$ across the metering restriction 32 decreases such that the engine operates in accordance with the minimum flow or deceleration curve 211 of FIGURE 4 until the point F is reached. Then as a balance is approached between the output force of the speed weight 108 and the governor spring 104, this causes the governor valve 106 to assume the position required for stable engine operation at point A on the required to run curve 210 of FIGURE 4. The $P_2-P_2'$ differential is proportional to flow. As altitude increases, the inlet pressure reduces to thereby reduce mass fuel flow through venturi 118. This in turn reduces $(P_2-P_2')$ to set a lower head $(P_2-P_3)$ across governor valve 100. This compensates for the well known droop rate of proportional mechanical type governor 100 to maintain engine stability at all altitudes.

Although only one embodiment of the present invention has been illustrated and described, it will be apparent to those skilled in the art that various changes in the form and relative arrangement of parts may be made to suit individual requirements without departing from the spirit and scope of the invention.

I claim:

1. In a fuel control system for a combustion engine having a fuel nozzle, a source of relatively high pressure fuel, a source of relatively low pressure fuel, a fuel conduit connected to deliver fuel from said source of relatively high pressure fuel to said nozzle, fuel flow control means operatively connected to said fuel conduit for controlling the flow of fuel therethrough, a branch fuel conduit connected to said source of relatively low pressure fuel and to said fuel conduit downstream from said fuel flow control means, said branch fuel conduit being operative to remove fuel from said fuel conduit, a first fuel flow control member responsive to an engine operating condition which varies with engine power output operatively connected to said branch fuel conduit for controlling the removal of fuel therethrough as a function of the engine operating condition, and a second fuel flow control member responsive to the flow of fuel through said fuel flow control means operatively connected to said branch fuel conduit for controlling the flow of fuel therethrough, said second fuel flow control means being operative to control the pressure head across said first fuel flow control member as a function of the mass rate of fuel flow through said fuel flow control means.

2. In a fuel control system as claimed in claim 1 wherein said fuel control means includes a fuel metering valve for controlling the flow area of said fuel conduit and fuel by-pass valve means responsive to engine speed for controlling the pressure drop across said fuel metering valve as a function of engine speed.

3. The fuel control system of claim 1 for a gas turbine engine having a compressor, said fuel flow control means including means responsive to compressor inlet and discharge pressures whereby the fuel flow through said fuel conduit is controlled as a function of the ratio between said compressor inlet and discharge pressures.

4. In a fuel control system for a gas turbine engine having a fuel nozzle, a fuel conduit connected to said nozzle, a first variable area fuel restriction member operatively connected to said first fuel conduit for controlling the fuel flow therethrough to said nozzle, a by-pass conduit connected to said fuel conduit downstream from said first fuel restriction member, a second fuel restriction member operatively connected to said by-pass conduit for controlling the fuel flow through said by-pass conduit from said fuel conduit, a third fuel restriction member operatively connected by said by-pass conduit downstream from said second fuel restriction member for controlling the fuel flow through said by-pass conduit, engine speed responsive means operatively connected to said second fuel restriction member for controlling the operation thereof as a function of engine speed, and fuel flow responsive means operatively connected to said third fuel restriction member for controlling the operation thereof as a function of the fuel flow through said first fuel conduit.

5. In a fuel control system for a gas turbine engine having a fuel nozzle; a first fuel conduit connected to said nozzle for supplying fuel to said nozzle; a first variable area fuel restriction member connected to the first fuel conduit for controlling the flow of fuel through said first fuel conduit; means operatively connected to said first variable area restriction member for controlling the operation thereof including a chamber, a pressure responsive member in said chamber, a first restriction communicating said chamber with compressor inlet pressure, a second restriction in series flow with said first restriction and communicating said chamber with compressor discharge pressure, said first and second restrictions having a predetermined fixed flow area ratio whereby a pressure is developed in said chamber which varies as a predetermined function of the ratio of compressor inlet and discharge pressure; a second fuel conduit operatively connected to said first fuel conduit downstream from said first fuel restriction member and arranged to remove fuel from said first fuel conduit; second and third variable area fuel restriction members operatively connected to said second fuel conduit for controlling the flow of fuel therethrough; fuel flow responsive means responsive to the mass of fuel flowing through the first fuel conduit downstream from said first fuel restriction member, with said fuel flow responsive means being operatively connected to the second fuel restriction member for controlling the operation thereof; and means responsive to an engine operating condition which varies with engine power output operatively connected to said third fuel restrictive member for controlling the operation thereof.

6. In a fuel control system for a gas turbine engine having a fuel nozzle; a source of relatively high pressure fuel; a source of relatively low pressure fuel; a first fuel conduit connected to deliver fuel from said source of relatively high pressure fuel to said nozzle; a first variable area fuel restriction member connected to said first fuel conduit for controlling the flow of fuel therethrough; fuel by-pass means responsive to engine speed operatively connected to said first fuel conduit for controlling the pressure drop across said first variable area restriction member as a function of engine speed; means responsive to a compressor generated fluid pressure operatively connected to said first variable area restriction member for controlling the operation thereof as a function of said compressor generated pressure; a second fuel conduit connected between said source of relatively low pressure fuel and said first fuel conduit downstream from said first fuel restriction member through which fuel is removed from said first fuel conduit; a second fuel restriction member connected between the first fuel conduit and the second fuel conduit for controlling the flow of fuel from the first fuel conduit to the second fuel conduit; valve means operatively connected to said second fuel conduit for controlling the pressure drop across said second fuel restriction member; fuel flow responsive means operatively connected to said first fuel conduit downstream from said first fuel restriction member, said flow responsive means being responsive to the mass of fuel flowing through the first fuel restriction member and operatively connected to said valve means for controlling the operation thereof; and engine speed responsive means responsive to the operational speed of the engine and operatively connected to said second fuel restriction member for controlling the operation thereof.

7. In a fuel control system for a gas turbine engine having a fuel nozzle, a control lever for controlling the operation of the engine, a first fuel conduit connected to said nozzle for supplying fuel to that nozzle, said first fuel conduit including a first variable area fuel restriction member for controlling the flow of fuel to said nozzle, a second fuel conduit connected to the first fuel conduit between said fuel nozzle and said first fuel restriction member, with said second fuel conduit including a second fuel flow restriction member, said second conduit being operative to remove fuel from said first fuel conduit, a third fuel restriction member operatively connected to said second fuel conduit, fuel flow responsive means operatively connected to said third fuel restriction member and responsive to the flow of fuel in the first fuel conduit downstream from said first fuel restriction member for controlling the removal of fuel through said second conduit as a function of the mass rate of fuel flow through said first fuel restriction member.

8. In a fuel control system for a gas turbine engine, said engine including a fuel nozzle, the combination of a first fuel conduit connected to said nozzle for supplying fuel to said nozzle, said first conduit including a first variable area fuel restriction member for controlling the flow of fuel to said conduit, a second fuel conduit connected to the first fuel conduit at a point between said nozzle and the first fuel restriction member, with said second fuel conduit including a second fuel flow restriction member, and a third fuel restriction member in series flow relationship with said second fuel flow restriction member, said second conduit being operative to remove fuel from said first fuel conduit, engine speed responsive means operatively connected to the second fuel restriction member to control the removal of fuel from the first fuel conduit as a function of engine speed, and fuel flow responsive means operatively connected to the third fuel restriction member for controlling the removal of fuel from the first conduit as a function of the flow of fuel through the first fuel conduit.

References Cited in the file of this patent

UNITED STATES PATENTS

| | | |
|---|---|---|
| 2,508,260 | Holley | May 16, 1950 |
| 2,616,507 | Greenland | Nov. 4, 1952 |
| 2,633,704 | Sarto | Apr. 7, 1953 |
| 2,643,513 | Lee | June 30, 1953 |
| 2,700,275 | Chandler et al. | Jan. 25, 1955 |
| 2,711,073 | Atkinson | June 21, 1955 |
| 2,714,803 | Abild | Aug. 9, 1955 |
| 2,720,751 | Kunz | Oct. 18, 1955 |
| 2,741,089 | Jagger | Apr. 10, 1956 |
| 2,775,231 | Silver | Dec. 25, 1956 |

FOREIGN PATENTS

| | | |
|---|---|---|
| 107,925 | Sweden | July 13, 1943 |